US006837351B2

(12) United States Patent
Showalter et al.

(10) Patent No.: US 6,837,351 B2
(45) Date of Patent: Jan. 4, 2005

(54) ELECTROMAGNETIC CLUTCH ASSEMBLY HAVING ENHANCED TORQUE THROUGHPUT

(75) Inventors: Dan Joseph Showalter, Plymouth, MI (US); Christopher John Kowalsky, Windsor (CA)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/377,421

(22) Filed: Feb. 28, 2003

(65) Prior Publication Data

US 2003/0221927 A1 Dec. 4, 2003

Related U.S. Application Data

(60) Provisional application No. 60/383,992, filed on May 29, 2002.

(51) Int. Cl.[7] ........................ F16D 13/04; F16D 27/115
(52) U.S. Cl. ........................................ 192/35; 192/84.7
(58) Field of Search ................... 192/35, 70.23, 192/84.7, 93 A

(56) References Cited

U.S. PATENT DOCUMENTS

| | | | | |
|---|---|---|---|---|
| 4,681,928 A | * | 7/1987 | Berger et al. ............... | 528/353 |
| 4,690,258 A | | 9/1987 | Teraoka et al. | |
| 4,899,859 A | | 2/1990 | Teraoka | |
| 4,989,686 A | * | 2/1991 | Miller et al. ................ | 180/197 |
| 5,083,986 A | | 1/1992 | Teraoka et al. | |
| 5,492,194 A | | 2/1996 | McGinn et al. | |
| 5,839,985 A | | 11/1998 | Teraoka | |
| 5,943,911 A | * | 8/1999 | Beckerman ................... | 192/35 |
| 5,966,999 A | | 10/1999 | Showalter et al. | |
| 5,980,415 A | | 11/1999 | Showalter | |
| 6,109,408 A | * | 8/2000 | Ikeda et al. .................. | 192/35 |
| 6,460,677 B1 | * | 10/2002 | Roscoe ....................... | 192/84.7 |
| 6,578,684 B2 | * | 6/2003 | Yamamoto et al. ........... | 192/35 |
| 2002/0079179 A1 | * | 6/2002 | Hirota et al. ................. | 192/35 |

OTHER PUBLICATIONS

Patent Abstracts of Japan, Vo. 016, No. 363 (M–1290), Aug. 5, 1992 & JP 04 113033 A (Tochigi Fuji Ind. Co. Ltd) Apr. 14, 1992.

* cited by examiner

*Primary Examiner*—Rodney H Bonck
(74) *Attorney, Agent, or Firm*—Brinks Hofer Gilson & Lione; Greg Dziegielewski

(57) ABSTRACT

An electromagnetic clutch assembly having a ball ramp operator provides enhanced torque throughput capability. The electromagnetic clutch assembly includes a primary or pilot friction clutch pack and a secondary or main friction clutch pack. A ball ramp operator which is actuated by the primary or pilot friction clutch pack includes a plastic washer or annulus adjacent one of the operator members. The plastic washer provides feedback which enhances the operation of the primary friction clutch pack, augments the compressive force applied to the secondary or main clutch pack and thus increases the torque throughput capability of the electromagnetic clutch assembly.

20 Claims, 3 Drawing Sheets

US 6,837,351 B2

ELECTROMAGNETIC CLUTCH ASSEMBLY HAVING ENHANCED TORQUE THROUGHPUT

RELATED APPLICATIONS

The present application claims the benefit of the filing date under 35 U.S.C. §119(e) of Provisional U.S. Patent Application Ser. No. 60/383,992, filed May 29, 2002, which is hereby incorporated by reference.

BACKGROUND OF THE INVENTION

The invention relates generally to an electromagnetic clutch and more specifically to an electromagnetic clutch having a ball ramp operator and improved torque throughput characteristics.

Clutches which are activated or energized by electromagnetic coils are extraordinarily common components in rotary power transmission systems, both in stationary applications and in motor vehicles. Such electromagnetic clutches may be broadly characterized by whether they provide on-off energy transfer or modulating energy transfer. In the case of the former, dog clutches which may include auxiliary synchronizing devices are utilized whereas in the latter, friction clutch packs having a plurality of interleaved friction plates or discs are utilized. In either case, an electromagnetic operator which translates or compresses components of the clutch upon energization activates the clutch and upon deenergization deactivates or relaxes the clutch.

One of the design and operational characteristics of electromagnetic clutches which receives significant engineering attention is power consumption. It is desirable, especially in motor vehicles, to design and utilize a clutch having low power consumption. Low power consumption is desirable in and of itself but it also reduces the heat generated by the coil and thus lower power consumption can reduce the need for cooling the coil, can improve the service life of the coil and is therefore overall a desirable design goal.

A design which exhibits low power consumption is generally referred to as a cam or ball ramp actuated clutch. Here, a pair of opposed plates having caming members or may have opposed arcuate recesses which receive balls or roller bearings separate upon relative rotation caused by drag resulting from energization of the electromagnetic coil. Such separation compresses an adjacent friction clutch pack which transfers drive energy or torque across the friction clutch pack. Such a device is disclosed in conjunction with a transfer case in U.S. Pat. No. 4,989,686, co-owned by the Assignee herein.

In addition to reducing power consumption, another constant goal of clutch design is increased torque throughput. The present invention is directed to a cam operated clutch having enhanced torque throughput.

SUMMARY OF THE INVENTION

An electromagnetic clutch assembly having a ball ramp operator provides enhanced torque throughput capability. The electromagnetic clutch assembly includes a primary or pilot friction clutch pack and a secondary or main friction clutch pack. A ball ramp operator which is actuated by the primary or pilot friction clutch pack includes a plastic washer or annulus adjacent one of the operator members. The plastic washer provides feedback which enhances the operation of the primary friction clutch pack, augments the compressive force applied to the secondary or main clutch pack and thus increases the torque throughput capability of the electromagnetic clutch assembly.

It is thus an object of the present invention to provide a cam actuated electromagnetic clutch having enhanced torque throughput.

It is a further object of the present invention to provide a cam actuated electromagnetic clutch for use in transfer cases, rear axles and other motor vehicle drive line components.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
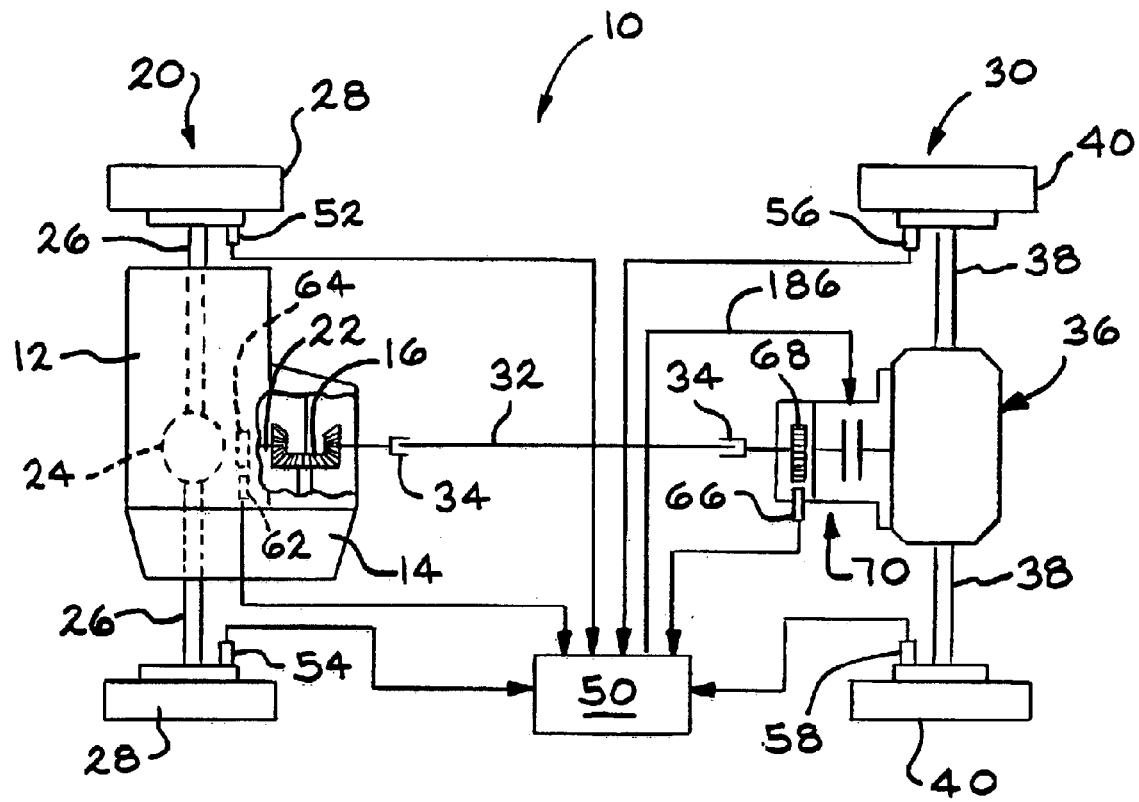
FIG. 1 is a diagrammatic view of a four-wheel drive motor vehicle power train having an electromagnetic clutch assembly according to the present invention utilized in conjunction with a rear differential.
Figure 3:
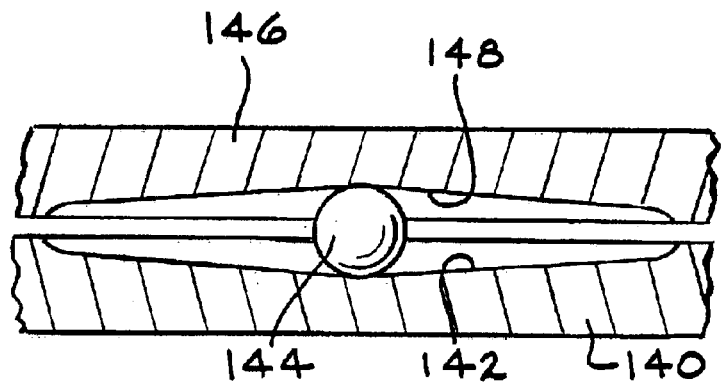
FIG. 3 is a flat pattern development of the ball ramp operator of the electromagnetic clutch assembly according to the present invention taken along line 3—3 of FIG. 2.

Referring now to FIG. 1, a four-wheel vehicle drive train incorporating the present invention is diagrammatically illustrated and designated by the reference number 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front drive line 20 comprising a front or primary propshaft 22, a front or primary differential 24, a pair of live front axles 26 and a respective pair of front or primary tire and wheel assemblies 28. It should be appreciated that the front or primary differential 24 is conventional.

The beveled or spiral beveled gear set 16 also provides motive power to a secondary or rear drive line 30 comprising a secondary propshaft 32 having appropriate universal joints 34, a rear or secondary differential assembly 36, a pair of live secondary or rear axles 38 and a respective pair of secondary or rear tire and wheel assemblies 40.

The foregoing description relates to a vehicle wherein the primary drive line 20 is disposed at the front of the vehicle and, correspondingly, the secondary drive line 30 is disposed at the rear of the vehicle, such a vehicle commonly being referred to as a front wheel drive vehicle. The designations "primary" and "secondary" utilized herein refer to drive lines providing drive torque at all times and drive lines providing supplemental or intermittent torque, respectively. These designations (primary and secondary) are utilized herein rather than front and rear inasmuch as the invention herein disclosed and claimed may be readily utilized with vehicles wherein the primary drive line 20 is disposed at the rear of the vehicle and the secondary drive line 30 and components within the secondary differential assembly 36 are disposed at the front of the vehicle.

Thus, the illustration of FIG. 1, wherein the primary drive line 20 is disposed at the front of the vehicle should be understood to be illustrative rather than limiting and that the components and the general arrangement of components illustrated is equally suitable and usable with a primary rear wheel drive vehicle. In such a vehicle, the primary differential 24 would replace the secondary differential assembly 36 at the rear of the vehicle and the secondary differential assembly 36 would be moved to the front of the vehicle to replace the primary differential 24.

Associated with the vehicle drive train 10 is a controller or microprocessor 50 which receives signals from a plurality of sensors and provides a control, i.e., actuation signal to an electromagnetic clutch assembly 70 operably disposed before the secondary differential assembly 36. Specifically, a first sensor such as a variable reluctance or Hall effect sensor 52 senses the rotational speed of the right primary (front) tire and wheel assembly 28 and provides an appropriate signal to the microprocessor 50. Similarly, a second variable reluctance or Hall effect sensor 54 senses the rotational speed of the left primary (front) tire and wheel assembly 28 and provides a signal to the microprocessor 50. A third variable reluctance or Hall effect sensor 56 senses the rotational speed of the right secondary (rear) tire and wheel assembly 40 and provides a signal to the microprocessor 50. Finally, a fourth variable reluctance or Hall effect sensor 58 associated with the left secondary (rear) tire and wheel assembly 40 senses its speed and provides a signal to the microprocessor 50. It should be understood that the speed sensors 52, 54, 56 and 58 may be independent, i.e., dedicated, sensors or may be those sensors mounted in the vehicle for anti-lock brake systems (ABS) or other speed sensing and control equipment. It is also to be understood that an appropriate and conventional counting or tone wheel is associated with each of the speed sensors 52, 54, 56 and 58 although they are not illustrated in FIG. 1.

The controller or microprocessor 50 may also receive information regarding the output speed of the transaxle 14. A variable reluctance or Hall effect sensor 62 which is associated with a tone wheel 64 on the front or primary prop shaft 22 may be utilized. In the alternative, a variable reluctance or Hall effect sensor 66 associated with the secondary differential assembly 36 and positioned adjacent a tone wheel 68 on an input shaft of the secondary differential assembly 36 may also be utilized. The controller or microprocessor 50 includes software which receives and conditions the signals from the sensors 52, 54, 56 and 58 as well as either the sensor 62 or the sensor 66, determines corrective action to improve the stability of the vehicle, maintain control of the vehicle and/or correct or compensate for a skid or other anomalous operating condition of the vehicle and provides an output signal to the electromagnetic clutch assembly 70.

Figure 2:
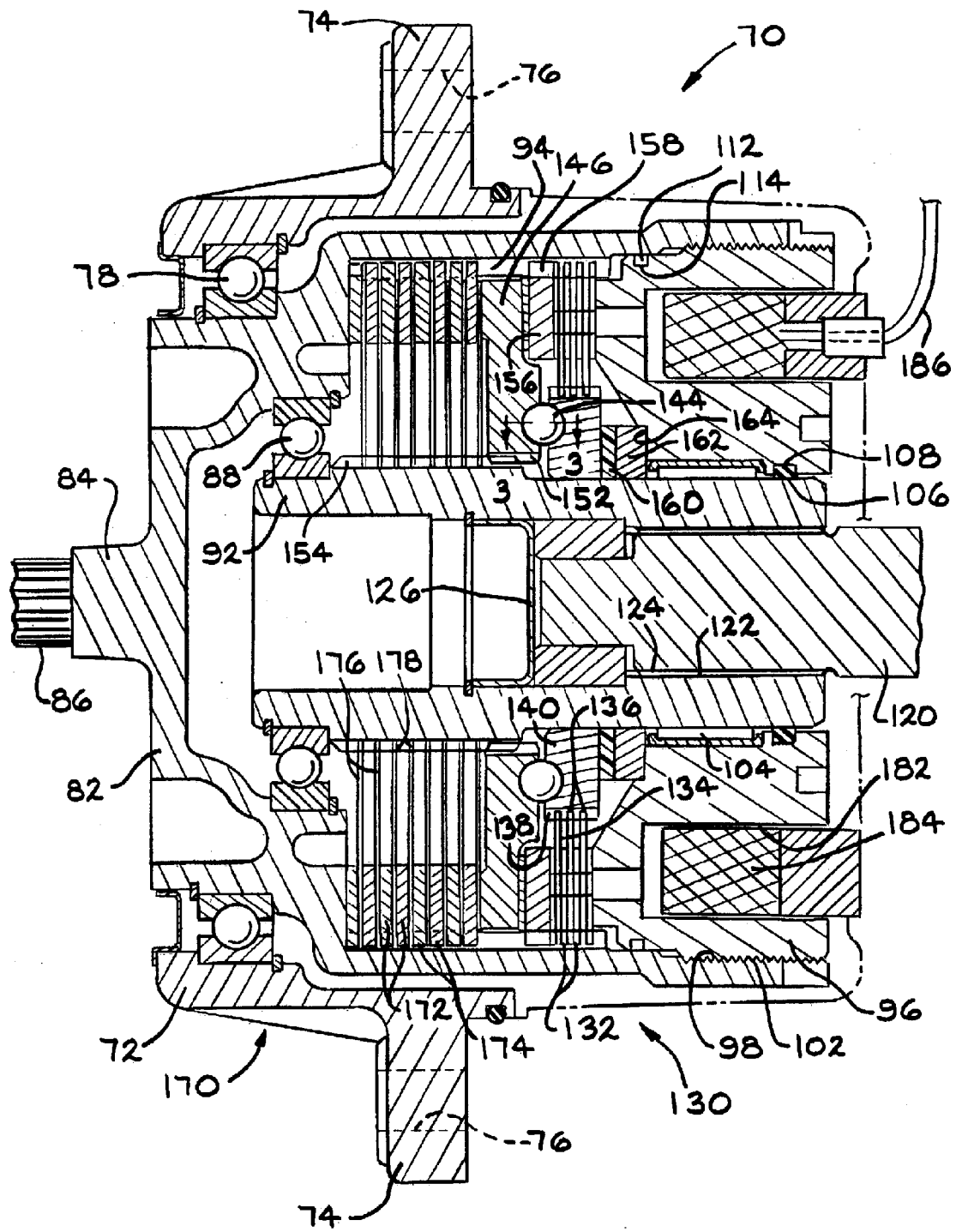
FIG. 2 is a full, sectional view of an electromagnetic clutch assembly according to the present invention.

Referring now to FIG. 2, the electromagnetic clutch assembly 70 includes a cylindrical, bell-shaped housing 72 having a continuous flange or a plurality of ears or lugs 74 defining a plurality of through openings 76 which are adapted to receive, for example, threaded fasteners which facilitate installation and disassembly from the housing of the differential assembly 36 illustrated in FIG. 1. The cylindrical housing 72 receives and supports an anti-friction assembly such as a ball bearing assembly 78 which freely rotatably supports a bell-shaped input member 82. The input member 82 may include a stub shaft 84 having male splines 86. Other positive drive means such as keyways, hexagonal flats and the like may also be defined by the input stub shaft 84. A second anti-friction assembly such as a ball bearing assembly 88 freely rotatably supports a cylindrical output hub 92. The interior cylindrical wall of the input member 82 defines a plurality of female splines or gear teeth 94.

Disposed radially intermediate the cylindrical input member 82 and the cylindrical output hub 92 is a clutch annulus or collar 96 having male threads 98 about its periphery which are complementary to and engage female threads 102 on the inner surface of the input member 82. Thus, the clutch annulus or collar 96 may be threaded into and removed from the input member 82 by appropriate relative rotation thereto as will be readily appreciated. Between the clutch annulus or collar 96 and the output hub 92 is a roller bearing assembly 104. A fluid tight elastomeric seal 106 is received within a circumferential groove 108 on the inside surface of the clutch annulus or collar 96 adjacent the roller bearing assembly 104 and provides a fluid tight seal between the output hub 92 and the clutch collar 96. A seal is also provided between the outer surface of the clutch hub or collar 96 and the input member 82 by an O-ring 112 which is received within a circumferential groove 114 in the clutch annulus or collar 96. An output shaft 120 preferably includes male splines 122 which mate with and rotationally engage female splines 124 on the cylindrical output hub 92. A suitable oil seal 126 is disposed within the output hub 92 and maintains a fluid tight interior region generally within the cylindrical input member 82.

Turning now to the friction clutch elements themselves, the electromagnetic clutch assembly 70 includes a primary or pilot clutch pack 130 having a first plurality of larger diameter clutch plates 132 with male or exterior splines which engage the female splines 94 within the input member 82. Thus, the larger diameter friction clutch plates 132 rotate with the input member 82. Interleaved with the first plurality of larger diameter clutch plates 132 is a second plurality of smaller diameter clutch plates 134 which have internal or female spines 136 which engage complimentarily configured male splines 138 on a first circular member or plate 140 which is freely rotatably received upon the cylindrical output hub 92. The first and second plurality of clutch plates 132 and 134 include suitable friction material disposed on at least one surface of each plate. The first circular plate 140 includes a plurality of ramp-like recesses 142 arranged in a circular pattern about the axis of the output hub 92. The recesses 142 define an oblique section of a helical torus. Disposed within each of the recesses 142 is a load transferring ball 144 or similar load transferring member which rolls along the ramps defined by the oblique surfaces of the recesses 142. A second circular member or plate 146 of larger diameter is disposed in opposed relationship with the first circular plate 140 and includes a like plurality of complementarily sized and arranged recesses 148. The load transferring balls 144 are thus received and trapped within the pairs of opposing recesses 142 and 148, the ends of the recesses 142 and 148 being curved and much steeper in slope than the interior regions of the recesses 142 and 148 such that the load transferring balls 144 are effectively trapped in the regions defined thereby.

It will be appreciated that the recesses 142 and 148 and the load transferring balls 144 may be replaced with other analogous mechanical elements which cause axial displacement of the circular plates 140 and 146 in response to relative rotation therebetween. For example, tapered rollers disposed in complementarily configured conical helices may be utilized.

An important design consideration of the recesses 142 and 148 and the load transferring balls 144 is that the geometry and the overall design and clearances of the clutch assembly 70 ensure that the clutch assembly 70 is not self-engaging. The electromagnetic clutch assembly 70 must not self-engage but rather must be capable of modulating clamping of the friction clutch packs in direct, proportional response to the input signal provided by the controller or microprocessor 50.

The second circular plate 146 includes a plurality of female splines or gear teeth 152 which are complementary to and engage output male splines or gear teeth 154 on the output hub 92. A circular plate 156 having splines 158 which engage the female splines 94 on input member 82 is disposed between the first or pilot clutch pack 130 and the second circular member 146.

On the side or face of the first circular plate 140 opposite the second circular plate 146 is an annular flat washer 160. On the face of the flat washer 160 opposite the first circular plate 140 is a backup or support annular member 162 which seats within a circumferential triangular groove 164 in the clutch collar 96.

The flat washer 160 is preferably made of plastic such as a thermoplastic polyimide or similar material. For example, a plastic manufactured by Mitsui Chemicals designated Aurum JQC3025 is suitable, as is, DuPont Vespel®, an engineered low mu polyimide plastic. Both have been found to provide good performance. The plastic material should have a sufficiently high PV value such that is will not self-sacrifice under the load and speed conditions present in a particular application.

A secondary or main friction pack assembly 170 resides between the second circular member 146 and a radially and circumferentially extending surface of the input member 82. The main friction clutch pack assembly 170 includes a first plurality 172 of larger diameter clutch plates or discs having male splines 174 which drivingly engage the splines 94 on the input member 82. Interleaved with the first plurality of larger diameter friction discs 172 is a second plurality of smaller diameter discs 176 having female splines 178 which engage the complementarily configured male splines 154 on the cylindrical output hub 92. Once again, the first and second plurality of clutch plates 172 and 174 include suitable friction material disposed on at least one surface of each plate.

Disposed within a suitable recess 182 of the clutch collar 96 is an electromagnetic coil 184. The electromagnetic coil 184 is connected to at least one electrical lead 186 which provides electrical power from the controller or microprocessor 50.

In operation, the application of electrical energy to the electromagnetic coil 184 draws the plate 156 toward the clutch hub 96 and creates drag which tends to rotate the first circular plate or member 140 relative to the second circular plate or member 146, causing the load transferring balls 144 to ride up the recesses 142 and 148 thereby driving the plates or members 140 and 146 apart. The second member 146 acts as an apply plate and this axial motion compresses the main or secondary friction clutch pack 170 and transfers torque between the input member 82 and the output shaft 120. The flat washer 160 amplifies or augments the torque generated by the main or primary clutch pack 130.

The added torque from the friction surface of the flat washer 160 is the normal force against the surface times the number of active surfaces times the coefficient of friction times the mean radius of the friction surface. This torque is translated into an additional axial force equal to the additional torque from above divided by the pitch radius of the load transferring balls 144, then divided by the tangent of the ball cam angle. From this it can be seen that, as this friction surface adds to the ball cam separating load, that increase itself causes an increase. This iterative process is referred to as feedback. It is necessary, however, to avoid the level of feedback from causing the clutch assembly 70 to lock due to the mathematical phenomenon of uncontrolled growth. This growth, when uncontrolled, is similar to that observed when a microphone is placed in front of a speaker. A graph of this relationship as applied in this device is presented as FIG. 4. There are two solutions to address excessive gain. One would be to choose a material for the friction surface which has a low coefficient of friction (approximately 0.03 to 0.05). The other solution would be to modify the ball ramp angle to approximately 16.5 degree. Either of these modifications should yield controllability and robustness against variations in physical characteristics normally observed over time and temperatures.

$$T_n = F\, R_n \mu$$

Where:
$T_n$=additional torque
F=ball separating force
$R_n$=mean radius of the single friction surface
$\mu$=dynamic coefficient of friction for the friction surface $$T = T_n + T_p$$

Where:
T=total torque
$T_n$=additional torque
$T_p$=primary clutch torque $$F = \frac{T}{R_b \tan(A_b)}$$

Therefore $$F = \frac{T_p}{R_b \tan(A_b)} + F \frac{R_n}{R_b \tan(A_b)}$$

Figure 4:
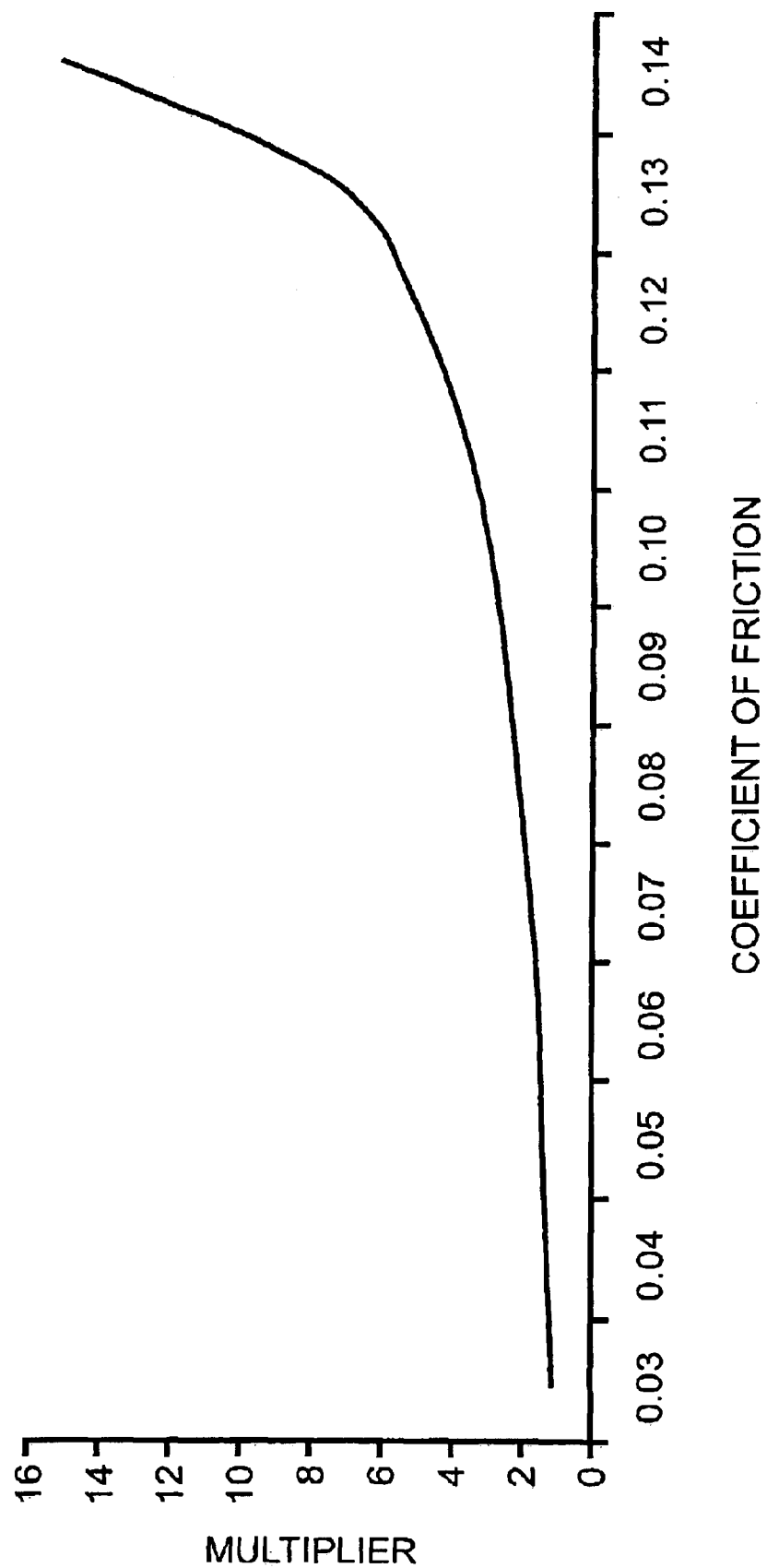
FIG. 4 is a graph which illustrated the torque amplification provided by an electromagnetic clutch assembly mechanism according to the present invention.

Referring now to FIG. 4, this graph presents information regarding how the electromagnetic clutch assembly 70 of the present invention provides increased torque amplification depending upon the coefficient of friction of the flat annulus or washer 160. It will therefore be appreciated that selection of the particular coefficient of friction of the material from which the flat washer or annulus 160 is fabricated as well as attention to the surface finish on its circumferential faces facilitates selection of a particular amount of multiplication of torque due to the feedback and enhanced clamping of the main or secondary friction clutch pack 170 achieved thereby.

The foregoing disclosure is the best mode devised by the inventors for practicing this invention. It is apparent however, that devices incorporating modifications and variations will be obvious to one skilled in the art of electromagnetic clutch assemblies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:
1. An electromagnetic clutch assembly comprising, in combination,
an input member and a coaxially disposed output member,
a first circular member having a plurality of camming surfaces, a second circular member adjacent said first circular member having a like plurality of camming surfaces and splined to said output member for rotation therewith, a like plurality of load transferring balls disposed on said camming surfaces, a circular friction member operably disposed between said first circular member and said input member, a first clutch pack having a first plurality of first clutch plates splined to said first circular member and a second, interleaved plurality of first clutch plates splined to said input member, an electromagnetic coil for engaging said first clutch pack, and a second clutch pack having a first plurality of second clutch plates splined to said input member and a second, interleaved plurality of second clutch plates splined to said output member.

2. The electromagnetic clutch assembly of claim 1 further including an outer housing adapted to receive said input member and an anti-friction bearing for rotatably supporting said input member within said outer housing.

3. The electromagnetic clutch assembly of claim 1 wherein said output member defines a splined passageway, and further including an output shaft having a splined exterior surface complementary to said splined passageway in said output member.

4. The electromagnetic clutch assembly of claim 1 wherein said friction washer is fabricated of a plastic.

5. The electromagnetic clutch assembly of claim 1 further including a plurality of oil seals for sealing an interior region of said clutch assembly containing said first and said second clutch packs.

6. The electromagnetic clutch assembly of claim 1 wherein said friction washer provides controlled feedback to enhance torque throughput of said second friction clutch pack.

7. The electromagnetic clutch assembly of claim 1 wherein said washer is fabricated of a thermoplastic polyimide.

8. A torque transfer device having a pair of clutches comprising, in combination, a rotatable input member, a rotatable output member, a main clutch having a first plurality of clutch plates coupled to said input member and a second plurality of clutch plates interleaved with said first plurality of clutch plates and coupled to said output member, a cam operator having first and second members defining opposing cam surfaces, said first cam member coupled to said output member for rotation therewith, a pilot clutch having a first plurality of clutch plates coupled to said input member and a second plurality of clutch plates interleaved with said first plurality of clutch plates and coupled to said second member of said cam operator, an electromagnetic coil for engaging said pilot clutch, and a friction washer operably disposed between said second member of said cam operator and said input member.

9. The torque transfer device of claim 8 further including an outer housing assembly adapted to receive said input member and an anti-friction bearing for rotatably supporting said input member in said outer housing.

10. The torque transfer device of claim 8 wherein said output member defines a splined, internal passageway, and further including an output shaft having a splined exterior complementary to said splined passageway in said output member.

11. The torque transfer device of claim 8 wherein said friction washer is fabricated of a plastic.

12. The torque transfer device of claim 8 wherein said friction washer provides controlled feedback to enhance torque throughput of said main clutch.

13. The torque transfer device of claim 8 wherein said friction washer is fabricated of a thermoplastic polyimide.

14. The torque transfer device of claim 8 further including a plurality of oil seals for sealing an interior region of said torque transfer device containing said first and said second clutches.

15. An electromagnetic clutch assembly comprising, in combination, an input member and an output member disposed for coaxial rotation, an electromagnetic coil, a first cam member disposed about said output member, a second cam member splined to said output member for rotation therewith, said cam members including means for axially separating said cam members upon relative rotation, a friction member operably disposed between said first cam member and said input member, a primary friction clutch having a first plurality of primary clutch plates splined to said first cam member and a second, interleaved plurality of primary clutch plates splined to said input member, and a secondary clutch having a first plurality of secondary clutch plates splined to said input member and a second, interleaved plurality of secondary clutch plates splined to said output member.

16. The electromagnetic clutch assembly of claim 15 further including an outer housing adapted to receive said input member and an anti-friction bearing assembly for rotatably supporting said input member within said outer housing.

17. The electromagnetic clutch assembly of claim 15 wherein said output member defines a splined bore and further including an output shaft having a splined surface complementary to said splined bore in said output member.

18. The electromagnetic clutch assembly of claim 15 wherein said washer is fabricated of plastic.

19. The electromagnetic clutch assembly of claim 15 wherein said washer is fabricated of a thermoplastic polyimide.

20. The electromagnetic clutch assembly of claim 15 wherein said means for axially separating said cam member includes a plurality of opposed pairs of arcuate recesses disposed in said cam members and a like plurality of load transferring members disposed in said recesses.

* * * * *